United States Patent [19]

Krambeck et al.

[11] 3,906,542

[45] Sept. 16, 1975

[54] CONDUCTIVELY CONNECTED CHARGE COUPLED DEVICES

[75] Inventors: Robert Harold Krambeck, South Plainfield; George Elwood Smith, Murray Hill; Robert Joseph Strain, Plainfield, all of N.J.

[73] Assignee: Bell Telephone Laboratories, Incorporated, Murray Hill, N.J.

[22] Filed: June 14, 1972

[21] Appl. No.: 262,787

[52] U.S. Cl. .................................. 357/24; 307/304

[51] Int. Cl.$^2$ ........................................ H03K 3/353

[58] Field of Search .... 317/235 G; 307/221 D, 304; 357/24

[56] References Cited

UNITED STATES PATENTS

| | | | |
|---|---|---|---|
| 3,643,106 | 2/1972 | Berwin et al. | 317/235 |
| 3,735,156 | 5/1973 | Krambeck et al. | 317/235 |
| 3,829,884 | 8/1974 | Borel | 357/24 |

FOREIGN PATENTS OR APPLICATIONS

| | | | |
|---|---|---|---|
| 2,123,592 | 8/1972 | France | 317/235 |

OTHER PUBLICATIONS

Electronics, "Micropower Goes International," p. 46, July 5, 1963.

IBM Tech. Discl. Bul., "Unidirectional Charge-Coupled Shift Register" by Anantha et al., Vol. 14, No. 4, Sept. 71, page 1234.

Bell System Tech. Journal, "Zero Loss Transfer Across Gaps in CCD" by Krambeck, Dec. 1971, pages 3169–3175.

*Primary Examiner*—Martin H. Edlow
*Attorney, Agent, or Firm*—G. W. Houseweart; A. J. Torsiglieri; D. I. Caplan

[57] ABSTRACT

There is disclosed improved charge coupled devices having, under the gaps between electrodes, heavily doped zones of a conductivity type such that the majority carriers in the zones are of the same polarity as the mobile charge carriers used for representing signal information. In a described embodiment, lightly doped zones of semiconductivity type opposite that of the heavily doped zones are disposed under the trailing edge of each electrode and intersecting the heavily doped zones. The heavily doped zones facilitate charge transfer across the gaps between electrodes; and the lightly doped zones provide potential wells of requisite asymmetry for two-phase operation. Advantages include reduced sensitivity to spurious surface charge, due to the heavily doped zones, and simpler fabrication and potentially smaller bit length, due to the intersecting of the heavily doped and the lightly doped zones.

7 Claims, 3 Drawing Figures

CONDUCTIVELY CONNECTED CHARGE COUPLED DEVICES

BACKGROUND OF THE INVENTION

This invention relates to charge coupled devices, and, more particularly, to charge coupled devices having, under the spaces between electrodes, heavily doped zones of semiconductivity type such that the majority carriers in the zones are of the same polarity as the mobile charge carriers intended for use in representing signal information.

As has by now become well known in the art, charge coupled devices (CCD's) operate by storing quantities of mobile charge carriers representing information in induced localized potential energy minima in a suitable storage medium and by transferring these quantities of mobile charge carriers within the medium serially through successive minima. Typically these minima are induced and controlled through voltages applied to field plate electrodes disposed over and insulated from the storage medium, the electrodes being disposed serially and defining thereunder a charge storage and transfer path (commonly called an "information channel" or just a "channel").

A problem early recognized in CCD's has been that of controlling and facilitating the transfer of the quantities of mobile charge carriers across those portions of the storage medium beneath the spaces between successive electrodes. Such spaces are a problem not only because the electric field therein is not well controlled, but also because ionized charge can migrate into such spaces and can have significant deleterious effects on charge transfer. Many approaches have been taken to alleviate the problems.

An obvious approach is simply to minimize the extent of such spaces. However, this is not readily accomplished to a sufficient degree without involving more complex technologies (such as multiple-level metallization) or without imposing unacceptably precise tolerances on electrode formation with proved technologies.

Several priorly disclosed techniques have sought to alleviate the problem through disposition of restricted, well-controlled amounts of immobile charge in the insulator beneath the spaces and/or in the storage medium beneath the spaces. For example, the copending U.S. Pat. application (G. F. Amelio 4–6), Ser. No. 157,508, filed June 28, 1971, in the names of G. F. Amelio and R. H. Krambeck, which was abandoned in 1972, discloses use of an amount of immobile charge sufficiently great to cause the mobile carrier density at the end of a transfer period to be a monotonically increasing function in the space between the electrodes in the desired direction of charge transfer, but sufficiently small that the storage medium between the electrodes is nevertheless depleted of mobile charge carriers with operating voltages applied and no signal charge introduced into the channel.

Other copending patent applications, e.g., U.S. Pat. application (G. F. Amelio 3–8–3) Ser. No. 157,507, filed June 28, 1971, on behalf of G. F. Amelio, R. H. Krambeck, and K. A. Pickar, which issued on May 12, 1974 as U.S. Pat. No. 3,796,932, and U.S. Pat. application (R. H. Krambeck 9–1) Ser. No. 157,510, filed June 28, 1971, on behalf of R. H. Krambeck and C. H. Sequin, which issued on May 22, 1973 as U.S. Pat. No. 3,735,156, disclose the use of graded and uniform densities of immobile charge beneath the spaces between the electrodes to provide field enhanced charge transfer through those regions and also, in some cases, to enable those regions to operate as storage sites. However, in all these aforementioned teachings it was thought important that the amount of immobile charge used be kept sufficiently small that the zones of immobile charge were completely depleted of mobile charge carriers with operating voltages applied in the absence of signal charge.

SUMMARY OF THE INVENTION

In view of the foregoing, an important aspect of this invention is a recognition that the regions under spaces between electrodes in certain types of charge coupled devices advantageously are degenerately doped to provide copious amounts of mobile carriers such that those regions appear as essentially electrical short circuits, i.e., highly conductive, to facilitate transfer of signal charge thereacross and to reduce sensitivity to spurious adsorbed surface charge.

Accordingly, a central feature of this invention is the disposition, in the regions of the storage medium beneath the spaces between electrodes, of heavily doped localized zones having mobile charge carriers of the same polarity as the signal charge in sufficient quantity to avoid complete depletion, even in the absence of signal charge, with operating voltages applied.

In a preferred embodiment of this invention, the aforementioned heavily doped zones are employed in combination with more lightly doped zones having mobile charge carriers of the opposite polarity, the lightly doped zones providing in the potential wells an asymmetry useful for ensuring unidirectional charge transfer in the manner disclosed in U.S. Pat. application (R. H. Krambeck-R. H. Walden 7–3) Ser. No. 157,509, filed June 28, 1971, which issued in Jan. 29, 1974 as U.S. Pat. No. 3,789,267. This embodiment is preferred for processing reasons, inasmuch as the heavily doped and lightly doped zones can be allowed to intersect with consequent reductions in processing tolerances and ultimate device size, and also for performance reasons due to the many orders of magnitude range of doping concentration available for adjusting operating characteristics.

BRIEF DESCRIPTION OF THE DRAWING

It is believed the invention, including the aforementioned and other characteristics and advantages, will be better understood from the following more detailed description taken in conjunction with the accompanying drawing in which.

It will be appreciated that for simplicity and clarity of illustration and explanation the figures have not necessarily been drawn to scale.

DETAILED DESCRIPTION

Figure 1:
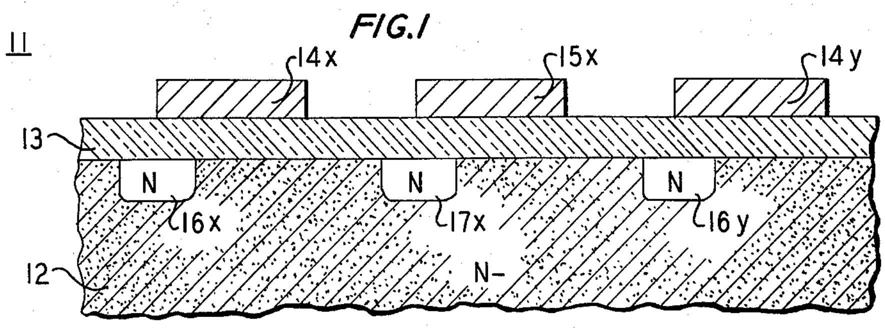
FIG. 1 is a cross-sectional view taken along a portion of the information channel of a charge coupled device as it appears after a significant intermediate step in accordance with this invention.

With more specific reference now to the drawing, FIG. 1 is a cross-sectional view taken along a portion 11 of the information channel of a charge coupled device substantially as it appears after a significant intermediate fabrication step in accordance with a preferred embodiment of this invention. As shown, portion 11 includes a storage medium 12, the bulk of which illustratively is of $N^-$-type semiconductive material, such as silicon doped with phosphorus to a concentration of about $10^{14}$ to $10^{16}$ donors per cubic centimeter. Over storage medium 12 there is disposed a thin insulating layer 13, for example, about 1000 Angstroms, of silicon oxide. Over layer 13 in conventional fashion there are disposed a plurality of spaced, localized electrodes 14*x*, 15*x*, and 14*y* providing field plate electrodes through which appropriate voltages may be applied for causing charge coupled device operation.

For the purpose of establishing terminology, it will be assumed that it is desired to transfer mobile charge carriers representing signal information to the right in the figure. Accordingly, it is logical to call the rightmost portion of each electrode the "leading" portion of that electrode and correspondingly to call the leftmost portion the "trailing" portion, with respect to the selected direction of advance of information.

With this terminology in mind, it will be seen that portion 11 in FIG. 1 additionally includes a plurality of more heavily doped N-type zones 16*x*, 17*x*, and 16*y*, separate ones being disposed under the trailing edge of the electrodes 14*x*, 15*x*, and 14*y*, respectively. Zones 16 and 17 are for providing potential barriers under the electrodes for providing requisite asymmetry for causing unidirectional transfer of charge in response to operating voltages. As such, the aforementioned Krambeck-Walden patent application Ser. No. 157,509 (now the aforementioned U.S. Pat. No. 3,789,267) is highly relevant in its discussion of the relative doping and vertical extent of zones 16 and 17 with respect to the other portions of the surface. And, as such, it will be appreciated that, because zones 16 and 17 typically will be shallow and of well-controlled concentration, they are advantageously, though, of course, not necessarily, formed by ion implantation.

However, unlike the teaching in the aforementioned Krambeck-Walden patent application, zones 16 and 17, in accordance with this invention, advantageously are disposed as shown substantially centered under the trailing edge of their respective electrodes; and the widths of zones 16 and 17 advantageously are designed to be greater than the tolerance allowed in positioning the trailing edge of electrodes 14 and 15 so that the trailing edge of each electrode always will fall directly over some portion of its respective subzone 16 or 17.

Inasmuch as the width of that portion of zone 16 or 17 over which an electrode falls determines the width of the potential barrier and inasmuch as the width of the barrier typically should not be too narrow for optimum operation, the width of zones 16 and 17 should be the aforementioned tolerance plus a minimum barrier width; and the structure may be designed with nominal position of the trailing edge of the overlying electrode offset to the left from the center of the zone by the one minimum barrier width. In practice, with bulk portion 12 of about $5 \times 10^{14}$ donors/cm$^3$ and the thickness of layer 13 equal to 1000 Angstroms, a minimum barrier width of about 2.5 microns has been found feasible.

Although the off-center design enables minimum size for zones 16 and 17, minimum size is not usually significant since, as discussed below, the amount by which such zones extending into the space between electrodes is (or can be made to be) essentially immaterial, provided, of course, that such extent does not become bigger than the space itself. Accordingly, for convenience, it is sometimes desirable to have the width of zones 16 and 17 be the aforementioned tolerance plus twice the minimum barrier width and then to have the nominal position of the trailing edge of an electrode centered thereover.

Figure 2:
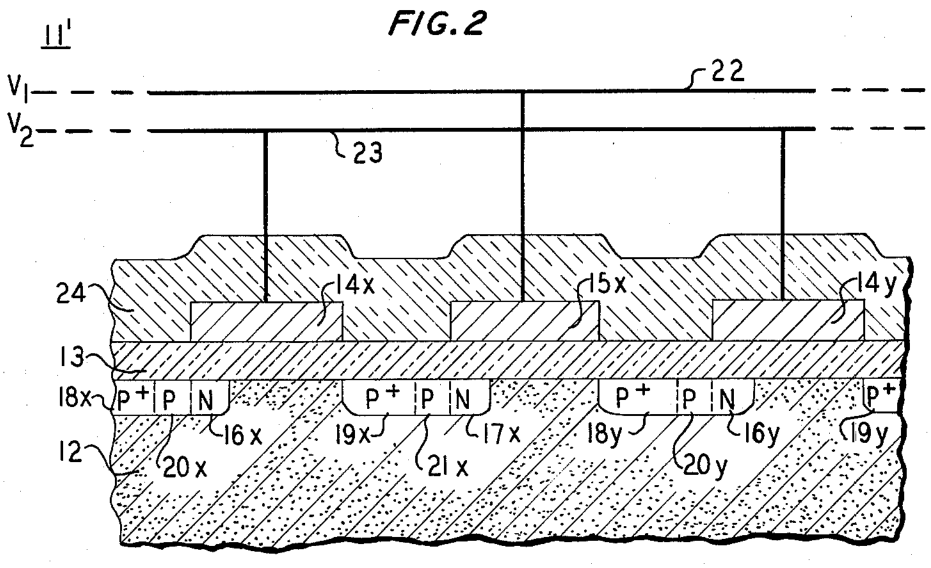
FIG. 2 is a cross-sectional view showing the structure of FIG. 1 after further processing in accordance with a preferred embodiment of this invention has been substantially completed.

With reference now to FIG. 2, there is shown a cross-sectional view of the structure of FIG. 1 after further processing in accordance with a preferred embodiment of this invention has been substantially completed.

To reflect the additions which have been made, the overall structure is, in FIG. 2, given reference numeral 11'.

In going from portion 11 of FIG. 1 to portion 11' of FIG. 2, a relatively heavy dose of P-type impurities first are introduced uniformly, for example, by ion implantation and/or diffusion into essentially only those portions of storage medium 12 under the spaces between electrodes 14 and 15 to form $P^+$-type zones 18*x*, 19*x*, 18*y*, and 19*y* (hereinafter sometimes referred to as zones 18 and 19) and P-type zones 20*x*, 21*x*, and 20*y* (hereinafter sometimes referred to as zones 20 and 21). The relative concentrations and, in some cases, the absolute concentrations of storage medium 12 and zones 16-21 are important to this invention and will be discussed in detail hereinbelow. However, at this point it will be appreciated that even though a uniform dose of P-type impurities were introduced through the spaces, zones 20 and 21 are less P-type than zones 18 and 19 because of the compensating effect of the N-type impurities (portions of zones 16 and 17) previously introduced into those zones.

Either before or after introduction of the P-type impurities, provision is made in conventional fashion for supplying operating voltages, e.g., $-V_1$ and $-V_2$, through clock lines 22 and 23, as shown, to electrodes 14 and 15. And, after introduction of the P-type impurities, the entire structure advantageously, though not necessarily, is coated with an essentially uniform layer 24, e.g., phosphorous glass, silicon nitride, aluminum oxide, or silicon oxide, which is as impervious as possible to contaminants such as sodium ions.

Figure 3:
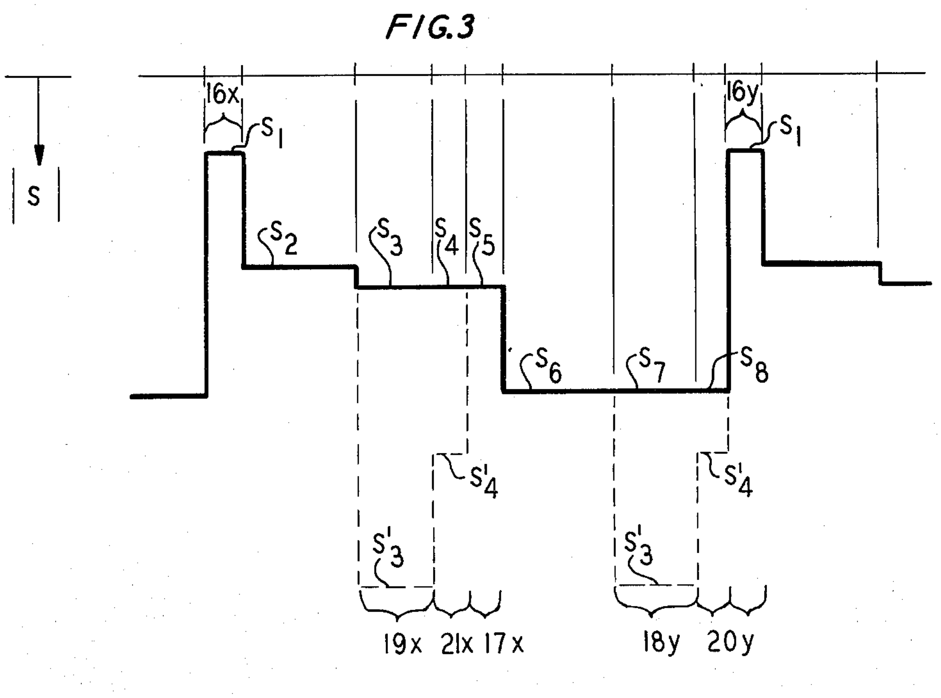
FIG. 3 is a diagram depicting typical surface potentials in the structure of FIG. 2 with typical operating voltages applied.

Before describing further the internal details of the structure of FIG. 2, it is believed helpful to consider first the diagram of FIG. 3 depicting relative surface potentials which advantageously are made to occur in the structure of FIG. 2 by appropriate coaction of operating voltages and storage medium dopant concentrations.

In FIG. 3 the magnitude of surface potential, S, is depicted as increasing downward; and S is of polarity such that increasing magnitude implies increasing attractiveness for mobile charge carriers of the type intended to be used for signal charge. Typically, a structure of the type shown in FIG. 2 will be operated in what is commonly termed in the art as a "P-channel enchancement" mode, which implies that signal charge carriers are holes and applied voltages $V_1$ and $V_2$ and surface potentials, S, are negative with respect to storage medium 12.

In more detail now, the surface potential diagram of FIG. 3 assumes that a pair of negative clock voltages $V_1$ and $V_2$ have been applied to clock line conduction paths 22 and 23, respectively, in FIG. 2 and that the magnitude of $V_1$ is greater than the magnitude of $V_2$. The solid line portion of the diagram depicts the surface potential which obtains in the absence of mobile signal charge; and for reasons which will become apparent hereinbelow, the broken line portion depicts the surface potential which would be required to completely deplete $P^+$-type zones 18 and 19 and P-type zones 20 and 21 of mobile charge carriers.

As can be seen, the solid line portion is spatially periodic with two-electrode periodicity, e.g., from the leading edge of a first electrode (14*x*) to the leading edge of the second succeeding electrode (14*y*), this being the typical periodicity for a two-phase charge coupled device. Each spatial period, of course, is what is commonly termed in the art a "bit length." For convenience of description, various relevant portions of the solid line, corresponding to various relevant portions of the storage medium, have been labeled $S_1$-$S_8$. As can be seen, in each bit length, $S_1$ corresponds to zones 16; $S_2$ corresponds to the spaces between zones 16 and 19; $S_3$ corresponds to zones 19; $S_4$ corresponds to zones 21; $S_5$ corresponds to zones 17; $S_6$ corresponds to the spaces between zones 17 and 18; $S_7$ corresponds to zones 18; $S_8$ corresponds to zones 20.

In operation, the regions of potential $S_1$-$S_4$ together constitute one-half the bit length; and regions of potential $S_5$-$S_8$ constitute the other half-bit length. With the clock voltages in the half-cycle depicted in FIG. 3 ($|V_1| > |V_2|$) the rightmost half-bits ($S_5$-$S_8$) are most attractive to signal charges (holes) and so operate as the storage sites. At the other half of the clock cycle ($|V_2| > |V_1|$), the leftmost half-bits ($S_1$-$S_4$) will be more attractive and so will then operate as the storage sites. And, of course, at each alternation of the clock voltages, the signal charge is transferred one half-bit to the right in FIGS. 2 and 3.

As alluded to hereinabove, the principal operating function of $P^+$-type zones 18 and 19 and P-type zones 20 and 21 is that of providing essentially electrical short circuits across the spaces between electrodes for facilitating signal charge transfer thereacross. For this reason, devices in accordance with this invention may be called "Conductively Connected Charge Coupled Devices." And, for this reason, an important first minimum requirement of the structure of FIG. 2 is that the concentration of P-type impurities in zones 18-20 be sufficiently great that no portions of these zones can be depleted of mobile charge carriers (holes) with desired operating voltages applied. Inasmuch as zones 18 and 19 are more strongly P-type than are zones 20 and 21, attention need be directed only to zones 20 and 21 to meet this first requirement.

But, the effective P-type concentration of zones 20 and 21 is not a directly known quantity. Rather, it is determined by subtracting the known N-type concentration in zones 16 and 17 from the known P-type concentration in zones 18 and 19. Accordingly, a discussion of typical concentrations in zones 16 and 17 is in order.

As taught in more detail in the aforementioned Krambeck-Walden application Ser. No. 157,509, the function of zones 16 and 17 is that of providing asymmetry to the potential well under their respective electrodes, i.e., providing a potential barrier to prevent signal charge flow to the left in FIG. 2. And, as further taught therein, the barrier height ideally should be about equal to or more than the peak-to-peak variation in surface potential with operating clock voltages applied. In FIG. 3, the difference, denoted $S_B$, between potentials $S_1$ and $S_2$ and the difference between potentials $S_5$ and $S_6$ is the barrier height; and, as can be seen, $S_B$ is illustrated as being about equal to the peak-to-peak variation in surface potential.

Assuming all of the immobile charge in zones 16 and 17 is located at the surface (interface between storage medium 12 and insulator 13) and further assuming zones 16 and 17 are completely depleted of mobile charge carriers, the barrier height is given, to a first order approximation, by the expression:

$$S_B = \frac{Q_B d_i}{\epsilon_i} \tag{1}$$

where:

$Q_B$ is the immobile barrier charge, in coulombs per square centimeter;

$d_i$ is the insulator thickness, in centimeters; and $\epsilon_i$ is the permitivity of insulator 13, in farads per centimeter. Typically, insulator 13 is silicon oxide with $\epsilon_i = 0.35 \times 10^{12}$ farads/cm and with $d_i$ about $10^{-5}$ cm ($10^3$ Angstroms). Then, for example, a fabricationally convenient barrier charge of about $1.5 \times 10^{12}$ donors/cm$^2$ provides a $Q_B$ of about $2.4 \times 10^{-7}$ coulombs/cm$^2$ and an $S_B$ of about 7 volts. Although, as discussed hereinbelow, in typical operation the foregoing assumptions (especially that of complete depletion) giving rise to Equation 1 do not always obtain, Equation 1 does provide a useful first design approximation.

With reference again to FIG. 3, in operation it is desired that any mobile signal charges (holes) which are within any given bit length are naturally attracted into the most negative part thereof, i.e., the local storage site, which, as illustrated, are regions of surface potential $S_6$-$S_8$. Inasmuch as $S_5$ (the top of the barrier) is the least attractive surface potential under electrode 15*x*, the voltages and dopant concentrations advantageously are adjusted such that the magnitude of $S_5$, written $|S_5|$, is greater than the $|S_2|$. Otherwise some of the signal charge which was under electrode 14*x* when the clock voltages were in the other half-cycle ($|V_2| > |V_1|$) cannot be transferred over the barrier that would be represented by $S_5$.

As is known, in structures of the type shown in FIG. 2, surface potential, S, as a function, $S(V_A, Q)$, of both applied voltage, $V_A$, and the amount of charge, Q, other than background dopant charge, N, present in the structure is given by the expression $$S = H + \frac{J}{2} - \sqrt{HJ + \left(\frac{J}{2}\right)^2} = S(V_A,Q) \tag{2}$$

where:

$$H = V_A + \frac{d_i Q}{\epsilon_i} + \frac{d_i Q_{ss}}{\epsilon_i} \tag{3}$$

and:

$$J = 2\epsilon_S q N \left[\frac{d_i}{\epsilon_i}\right]^2 \quad (4)$$

where: $\epsilon_S$ is the permitivity of storage medium 12, in farads per centimeter; N is the dopant concentration, in dopants per cubic centimeter, in the bulk portion of storage medium 12; $Q_{ss}$ is the fixed charge associated with insulator 13; $q$ is electronic charge, which is about $1.6 \times 10^{-19}$ coulombs per electron; and the other symbols are as hereinbefore defined.

With the foregoing in mind, it is seen that the requirement, $|S_5| > |S_2|$, becomes: $|S_5(V_1, Q_B)| > |S_2(V_2, O)|$ (5) where: $V_1$ is the potential applied to electrode 15$x$ through clock line 22; and $Q = Q_B$ is the barrier charge, in coulombs per square centimeter.

The aforementioned minimum requirement that zones 20 and 21 not be completely depleted of mobile charge in operation can be expressed in equation form as follows. As alluded to hereinabove, broken line $S_3'$ and $S_4'$ in FIG. 3 represent those surface potentials which would be required to completely deplete zones 18 and 19 and zones 20 and 21, respectively. It will be appreciated that, prior to complete depletion, the mobile holes in each pair of contiguous zones, e.g., 18$x$-20$x$, 19$x$-21$x$, 18$y$-20$y$, etc., will redistribute themselves such that both zones within each pair are at the same potential. This is represented in FIG. 3 by the fact that $S_3 = S_4$ and $S_7 = S_8$.

Additionally, it will be appreciated also that, prior to complete depletion, each pair of contiguous P-type zones will adjust itself in surface potential (by gaining or losing mobile holes) until it assumes the lower of the two potentials thereadjacent. This, of course, is because each pair is essentially electrically floating with respect to, i.e., not significantly directly affected by, applied voltages $V_1$ and $V_2$. Thus, in FIG. 3, $S_3$ and $S_4$, the potentials of contiguous zones 19$x$ and 21$x$, are illustrated as being equal to $S_5$, the lower (most negative) of the two potentials ($S_2$ and $S_5$) there adjacent; and $S_7$ and $S_8$, the potentials of contiguous zones 18$y$ and 20$y$, are equal to $S_6$ rather than $S_1$.

With the foregoing in mind, it is now readily seen that the requirement that zones 20 and 21 not be completely depleted can be expressed as $|S_4'| > |S_6|$, which, more specifically, is:

$$\left|\frac{(Q_p + Q_B + S_{SS})^2}{2\epsilon_S q N}\right| > |S_6(V_1, O)| \quad (6)$$

where: $Q = Q_p + Q_B + Q_{ss}$ is the immobile charge affecting surface potential in zones 20 and 21 and $Q_p$ is the number of P-type dopants introduced into zones 18-21; $Q_B$ is the barrier charge in zones 16-17, and $Q_{ss}$ is the fixed charge associated with insulator 13; and $\epsilon_S$ is the permitivity of the storage medium (for silicon, $\epsilon_S = 1.05 \times 10^{-12}$ farads/cm). Equation 2 is not used for $S_4'$, since there is no electrode thereover.

In Equation 6, above, $Q_p$ and $Q_B$ are positive numbers for N-type dopants (positively ionized donors); and are negative numbers for P-type dopants (negatively ionized acceptors). Accordingly, with a structure as in FIG. 2, $Q_B > O$ and $Q_p < O$. $Q_{ss}$ takes the sign of the charge resident in insulator 13, and, with silicon oxide, usually is positive, typically about $1 \times 10^{11}$ charges per cm$^2$ or about $1.6 \times 10^{-8}$ coulombs per cm$^2$.

A further consideration useful for characterizing operation of a structure such as shown in FIG. 2 is that the surface of all parts of the channel should be maintained always in depletion to minimize the effects of traps at the storage medium-insulator interface. Inasmuch as $S_1$ is the least negative of the surface potentials occurring in FIG. 2, this depletion consideration may be written as:

$$|S_1(V_2, Q_B)| > \frac{E_g}{2} - S_F \quad (7)$$

where: $E_g$ is the band gap voltage of the storage medium; and $S_F$ is the magnitude of the difference between the Fermi level and the nearer band edge outside the depletion region. For silicon, $E_g$ is about 1.1 volts and for a typical structure such as shown in FIG. 2, $S_F$ is about 0.25 volt. Thus, Equation 7 typically is $|S_1(V_2, Q_B)| > 0.3$ volt.

Using the foregoing considerations, a practical design could proceed as follows. $Q_{ss}$, $\epsilon_i$, and $\epsilon_S$ would be fixed by the choice of convenient materials, e.g., silicon oxide as insulator 13 and silicon as storage medium 12. Insulator thickness $d_i$ would be made as thin as convenient, typically 1,000 Angstroms ($10^{-5}$ cm) to keep requisite applied voltage small. The background doping N is chosen as a compromise at about $10^{14} - 10^{16}$ per cm$^3$, typically $10^{15}$ per cm$^3$. Larger N decreases modulation of barrier height, $S_B$, due to pressure of signal charge, but also increases unwanted parasitic capacitances. Then, convenient operating voltages $V_1$ and $V_2$ are selected and an appropriate barrier height $S_B$ determined. Given $S_B$, Equation 1 is used to determine an appropriate $Q_B$. Then, $Q_p$ is determined to satisfy Equation 6.

For example, with $N = 10^{15}$, convenient voltages $-3$ volts and $-13$ volts may be selected for $V_1$ and $V_2$, respectively. Due to barrier height shrinkage at low applied voltages, caused by incomplete depletion of barrier zones 16 and 17, barrier height $S_B$ advantageously is greater than the peak-to-peak variation in surface potential (about 5 volts), and, for example, may be about 7 volts. Then, with Equation 1, $Q_B$ should be about $2.4 \times 10^{-7}$ coulombs/cm$^2$ or about $1.5 \times 10^{12}$ donors/cm$^2$. Then, $S_1(V_2, Q_B)$ is about $-0.4$ volts, which satisfies Equation 7. Also, $S_2(V_2, O)$ is about $-1.94$ volts; and $S_5(V_1, Q_B)$ is about $-4.18$ volts, so Equation 5 is satisfied. Finally, using Equation 6, $Q_p$ is found to be greater than about $3.2 \times 10^{-7}$ coulombs/cm$^2$ or about $2 \times 10^{12}$ acceptors/cm$^2$.

It is emphasized, however, that the value of $Q_p$ calculated from Equation 6 is only a minimum number to avoid complete depletion of zones 20 and 21. Advantageously, $Q_p$ is made much greater (at least a factor of 10 and often a factor of 100) than this minimal value of $Q_p$, to facilitate operation as an electrical short circuit between adjacent electrodes. For example, in the above example, a $Q_p$ of about $3.6 \times 10^{-5}$ coulombs per cm$^2$ or about $10^{14}$ acceptors/cm$^2$ is considered quite appropriate.

With the foregoing values for the parameters, electrodes of size 15 microns ($1.5 \times 10^{-3}$cm) laterally along the channel (in the direction of charge transfer) and of width 30 microns ($3 \times 10^{-3}$ cm) laterally perpendicular to the direction of charge transfer with 10 microns spaces between electrodes typically may be used. In this case, a width of 10 microns for barrier zones 16 and 17 also may be considered typical. However, as will be appreciated, there may be great variations from these numbers in accordance with principles taught herein and priorly known, depending, of course, on the particular design objective.

Having now analyzed in detail the more relevant quantities and other considerations important to operating a structure of the type shown in FIG. 2 in accordance with this invention, it is believed helpful now to speak more generally about certain features and characteristics of this invention so that the scope of this invention will be more clearly indicated and characterized.

First, it was mentioned hereinabove that disposition of the heavily doped zones and the storage medium beneath the spaces between electrodes reduces the sensitivity of the structure to adsorbed charge. This follows directly from the fact that as seen hereinabove the doping between electrodes typically will be greater than $10^{12}$ per $cm^2$ and, as is known in the art, for silicon oxide-silicon systems adsorbed charge and other spurious charge on the surface typically is less than $10^{12}$ charges per $cm^2$.

Also as mentioned hereinabove, an important reason for preferring the structure of FIG. 2 to prior art charge coupled device structures is that if offers fabrication advantages. These advantages result principally from the fact that the trailing edge of each electrode advantageously is designed nominally to be positioned over underlying barrier zones 16 and 17 and the electrodes are used as masks for introduction of the P-type impurities therebetween. More specifically, because barrier zones 16 and 17 and P-type zones 18–21 are designed as intersecting, it is of little consequence that electrodes 14 and 15 cannot be precisely aligned thereover. Because P-type zones 20 and 21 are adapted such that they are never completely depleted, there is little effect on performance whether those zones are wider or narrower than indicated in FIG. 2 due to misalignment of electrodes 14 and 15, provided, however, that the trailing edge of each electrode is nevertheless located over some portion of the N-type barrier zone 16 or 17 thereunder of sufficient width to operate as a barrier. This, of course, is the reason for the foregoing comment that the barrier zones 16 and 17 advantageously are designed to be greater than the tolerance allowed in forming the trailing edge of the electrode thereover.

If the worker in the art finds it more convenient, for any reason, to form a stepped oxide structure of the type described in U.S. Pat. No. 3,651,349, issued Mar. 21, 1972, to D. Kahng and E. H. Nicollian, he, of course, in that case need not use barrier zones 16 and 17, but rather may employ the stepped oxide to achieve the barrier. In this case, the more heavily doped zones in the spaces between the electrodes can be formed prior to electrode formation but, if so formed, the alignment of the electrodes therewith would be more critical. Alternatively, the heavily doped zones may be formed in a self-aligned fashion known, for example, to the so-called "silicon gate" technology or the so-called "refractory gate" technology by diffusing or ion implanting, using the electrodes as a mask in the same fashion as discussed hereinabove with respect to FIG. 2.

And, finally, it is believed significant to make note of the fact that in the structure of FIG. 2 P-type impurities are introduced and disposed symmetrically with respect to the electrodes thereadjacent. It will be appreciated by those in the art that, because of the manner of doing ion implantation and then doing a heating step in which the implanted impurities are activated, there will be some small penetration of the P-type impurities under the edges of the electrodes thereadjacent. But it will be further appreciated that this penetration will be essentially symmetrical, i.e., equal under each of said electrodes, so that the final structure will be one in which the P-type impurities nevertheless are symmetrically disposed under the space between electrodes. This is an important feature distinguishing a charge coupled device structure of the type shown in FIG. 2 from a bucket-brigade type of charge transfer device such as disclosed in U.S. Pat. No. 3,603,808, issued Sept. 7, 1971, to F. L. J. Sangster, and U.S. Pat. No. 3,621,283, issued Nov. 6, 1971, to K. Teer and F. L. J. Sangster. In the bucket-brigade type of charge transfer device, the more heavily doped zone underneath the space between electrodes is intentionally made to underlie significantly more of the electrode to the left than the electrode to the right; and it is, in fact, this asymmetry in disposition with respect to the space between electrodes that gives the bucket-brigade type of charge transfer device its directionality of charge transfer. Also, as is known, the fact that in a bucket-brigade structure the more heavily doped zone signficantly underlies an electrode manifests itself in an internal surface potential mode of operation in which the surface potential of the heavily doped zone is driven to values much greater than the applied voltages. As will be appreciated from the foregoing detailed analysis of the structure of FIG. 2, such is not the case in a structure in accordance with this invention.

At this point it is believed important to recognize what it is about the structure of FIG. 2 that enables operation as a charge coupled device, as distinguished from a bucket-brigade device, without having signal deterioration due to the copious quantities of mobile charges (holes) of the same type as those being used for signal charge available between each electrode and through which the signal charges must transfer at each alternation of the clock voltages. The reason can be seen by reference to FIG. 3, where it is seen that surface potentials $S_3$ and $S_4$ (the potential of the P-type zones at the end of a transfer) are equal to each other and to $S_5$ (the surface potential of the barrier height and the transfer or zone). Inasmuch as $S_5$ is determined by the applied clock voltage, $V_1$, it will always be the same at the end of a transfer and so the potential of the P-type zones will also always be the same at the end of a transfer. Inasmuch as the surface potential of the P-type zone is always the same at the end of a transfer, the number of mobile charges therein also must always be the same at the end of the transfer. Thus, since there is no net modulation of the number of mobile charges in a P-type zone at the end of a transfer regardless of the number of signal charges transferred therethrough, it is readily seen that there is no modulation of the signal charges due to P-type zones.

From the foregoing paragraph, one can generalize that such heavily doped zones may be used between electrodes for facilitating transfer therebetween in any charge coupled device, provided the clock voltages are adjusted such that the surface potential of the heavily doped zones is always the same, at the trailing edge of the electrode (transferor electrode) giving up charge at the end of a transfer, regardless of the number of signal charges transferred therethrough during the transfer. For example, in a three-phase charge coupled device with no built-in barriers, heavily doped zones containing mobile charge carriers of the same type used for representing signal information can be used between each electrode, provided the applied clock voltages are adjusted such that the surface potential of the heavily doped zone adjacent the trailing edge of a transferor electrode is always the same at the end of a transfer therethrough. This can be accomplished by use of a clock voltage waveform in which each phase has three levels of potential, a "bias" level, a "hold" level, and a "transfer" level, in which the magnitude of the hold level is greater than the bias level, and the magnitude of the transfer level is greater than the hold level. In operation, the timing of the various potential levels is adjusted such that the transferor electrode is established at the "hold" level while there is still sufficient untransferred charge under the transferor electrode to maintain substantial conductivity across the length of the transferor electrode. This condition is readily obtained by establishing the "hold" potential under the transferor electrode prior to commencing the actual charge transfer step, i.e., while the adjacent two electrodes are at the "bias" potential. More specific details of the operation of such a three-phase device will be apparent from the foregoing.

Although the detailed description has been principally in terms of specific designs, such detail is intended to be, and will be understood to be, instructive rather than restrictive. Of course, many modifications will be apparent to those in the art and all such modifications which rely on the teachings contained herein and those principles reasonably suggested thereby are properly considered within the scope of this invention.

Of course, it will be apparent that the semiconductivity types and voltage polarities may be reversed in FIG. 2 as desired for operation in either the enhancement mode or the depletion mode.

What is claimed is:

1. Semiconductive apparatus including a semiconductive silicon storage medium the bulk of which is of one conductivity type, a silicon dioxide insulating layer over one surface of the medium, and an electrode assembly over the insulating layer comprising a succession of spaced electrodes, alternate electrodes being directly interconnected to form two sets of electrodes and adjacent electrodes being electrically isolated, further characterized in that along said one surface the medium comprises a first succession of degenerately doped surface zone means of the opposite conductivity type underlying and substantially coextensive with the effective gaps between adjacent electrodes for facilitating the transfer of charge carriers between successive storage sites located at surface regions of the medium underlying the electrodes and for avoiding complete depletion even in the absence of signal charge during operation, the trailing portion with respect to a predetermined direction of each surface zone being more heavily doped than its leading portion, and further comprises a second succession of surface regions, of the one conductivity type but more heavily doped than the bulk, underlying the trailing edge with respect to the predetermined direction of each electrode.

2. The apparatus of claim 1 in further combination with two phase voltage supply means connected between the two sets of electrodes, and characterized in that the doping in the surface zones of the opposite conductivity type is sufficiently high to avoid complete depletion in the presence of the interconnected voltage supply means.

3. Semiconductive apparatus including a semiconductive storage medium, the bulk of which is of one conductivity type, an insulating layer over one surface of the medium, and electrode means including a plurality of spaced field plate electrodes for establishing a succession of spaced storage sites in the medium and for transferring stored charge between successive sites in a predetermined direction, periodic ones of said electrodes being directly interconnected to form a plurality of interleaved sets, each of said sets comprising a plurality of electrically interconnected electrodes but the sets being electrically distinct, characterized in that the semiconductive storage medium includes a plurality of localized degenerately doped surface zone means of the conductivity type opposite that of the bulk and underlying and substantially coextensive with the effective gaps between successive electrodes of the plurality for providing highly conductive paths between successive storage sites in order to facilitate transfer or charge carriers thereacross and fo avoiding complete depletion even in the absence of signal charge during operation.

4. Semiconductive apparatus in accordance with claim 3 further characterized in that alternate electrodes of the plurality are directly interconnected to form two electrically distinct sets of electrically connected electrodes.

5. Semiconductive apparatus in accordance with claim 4 further characterized in that in the storage medium the material underlying the effective trailing edge of each electrode is of higher conductivity than the material underlying the effective leading edge to facilitate unidirectional charge transfer in the predetermined direction.

6. The apparatus of claim 4 in further combination with two-phase voltage supply means connected between the two sets of electrodes.

7. Semiconductive apparatus in accordance with claim 3 further including means for insuring unidirectional charge transfer in the predetermined direction.

* * * * *